(12) United States Patent
Rosenthal et al.

(10) Patent No.: US 6,864,308 B2
(45) Date of Patent: Mar. 8, 2005

(54) METHOD FOR MAKING POLYOLEFIN NANOCOMPOSITES

(75) Inventors: Jay S. Rosenthal, West Chester, PA (US); Michael D. Wolkowicz, Newark, DE (US)

(73) Assignee: Basell Poliolefine Italia S.p.A., Milan (IT)

( * ) Notice: Subject to any disclaimer, the term of this patent is extended or adjusted under 35 U.S.C. 154(b) by 149 days.

(21) Appl. No.: 10/170,733

(22) Filed: Jun. 13, 2002

(65) Prior Publication Data

US 2003/0232912 A1 Dec. 18, 2003

(51) Int. Cl.[7] .................................................. C08K 3/34
(52) U.S. Cl. ...................... 524/445; 524/447; 524/312
(58) Field of Search .................. 524/445, 447, 524/486, 312, 318; 501/145, 147

(56) References Cited

U.S. PATENT DOCUMENTS

| | | | |
|---|---|---|---|
| 3,470,122 A | 9/1969 | Ridgeway et al. ............ 260/23 |
| 3,730,757 A | 5/1973 | Knorre ...................... 117/47 A |
| 4,022,735 A | 5/1977 | Thompson ............ 260/29.7 W |
| 4,436,863 A | 3/1984 | Albee, Jr. et al. ........... 524/451 |
| 4,677,134 A | 6/1987 | Fudge ......................... 521/59 |
| 4,739,007 A | 4/1988 | Okada et al. ............... 524/789 |
| 4,764,326 A | 8/1988 | Hakim ....................... 264/211 |
| 4,810,734 A | 3/1989 | Kawasumi et al. ......... 523/216 |
| 5,055,498 A | 10/1991 | Brachman ................... 523/164 |
| 5,164,460 A | 11/1992 | Yano et al. ................. 524/445 |
| 5,514,734 A | 5/1996 | Maxfield et al. ............ 523/204 |
| 5,552,469 A | 9/1996 | Beall et al. ................. 524/445 |
| 5,880,197 A * | 3/1999 | Beall et al. ................. 524/445 |
| 5,910,523 A | 6/1999 | Hudson ...................... 523/213 |
| 5,952,095 A * | 9/1999 | Beall et al. ................. 428/332 |
| 6,033,749 A | 3/2000 | Hata et al. ................. 428/36.7 |
| 6,124,365 A * | 9/2000 | Lan et al. ................... 516/101 |
| 6,136,908 A | 10/2000 | Liao et al. .................. 524/445 |
| 6,225,394 B1 | 5/2001 | Lan et al. ................... 524/445 |
| 6,242,500 B1 * | 6/2001 | Lan et al. ................... 516/101 |
| 6,271,298 B1 | 8/2001 | Powell ....................... 524/445 |
| 6,287,634 B1 | 9/2001 | Beall et al. ................. 427/220 |
| 2001/0008699 A1 | 7/2001 | Bagrodia et al. ........ 428/475.2 |

FOREIGN PATENT DOCUMENTS

| | | | |
|---|---|---|---|
| DD | 281585 | 8/1990 | ............ C01F/7/22 |
| EP | 822163 | 2/1998 | ............ C01B/33/44 |
| EP | 1055706 | 11/2000 | ............ C08K/9/04 |
| GB | 1153776 | 5/1969 | ............ C08F/29/02 |
| WO | 9901504 | 1/1999 | ............ C08K/3/34 |
| WO | 0034375 | 6/2000 | ............ C08K/7/00 |
| WO | 0047657 | 8/2000 | ............ C08J/9/00 |
| WO | 0140369 | 6/2001 | ............ C08K/9/04 |

* cited by examiner

Primary Examiner—Katarzyna Wyrozebski

(57) ABSTRACT

A polyolefin nanocomposite is prepared by melt blending (a) a polyolefin and (b) a smectite clay in the presence of at least one intercalating agent that is a solid at room temperature and is selected from the group consisting of (a) hydroxy-substituted carboxylic acid esters, (b) amides, (c) hydroxy-substituted amides, and (d) oxidized polyolefins, wherein the ratio of the intercalating agent to the clay is at least 1:3, based on the ash content of the clay.

32 Claims, 1 Drawing Sheet

METHOD FOR MAKING POLYOLEFIN NANOCOMPOSITES

FIELD OF THE INVENTION

This invention relates to a process for preparing a nanocomposite from an olefin polymer matrix and a smectite clay.

BACKGROUND OF THE INVENTION

Layered clay minerals such as montmorillonite are composed of silicate layers with a thickness on a nanometer scale (1 nanometer=10 Å). Dispersions of such layered materials in polymers are frequently referred to as nanocomposites.

It is known that silicates such as smectite clays, e.g., sodium and calcium montmorillonite, can be treated with various types of swelling agents such as organic ammonium ions, to intercalate the swelling agent molecules between adjacent, planar silicate layers, thereby substantially increasing the interlayer spacing. The intercalated silicates can then be exfoliated, i.e., the silicate layers are separated, typically by shear mixing. The individual silicate layers, when admixed with a matrix polymer before, after, or during the polymerization of the matrix polymer, have been found to substantially improve one or more properties of the polymer such as modulus and/or high temperature characteristics.

For example, U.S. published application 2001/0008699 discloses polymer/platelet multi-layer films in which the inner layer is composed of a carrier resin and platelet particles of a specific size. The platelets can be clay materials or non-clays. Dispersing aids such as alcohols and water-dispersible polymers can be present. U.S. Pat. No. 4,764,326 discloses a process for blending a polyolefin, prior to extrusion, with an extrusion processing aid comprising (a) an acid amide or alkylene bis-amide, (b) an aliphatic hydrocarbon or mixtures thereof, and (c) an oxygen-containing high density ethylene polymer such as oxidized polyethylene. Fillers such as an unspecified type of clay can also be present. U.S. Pat. No. 4,810,734 discloses a method for producing composite materials by contacting a layered clay mineral such as montmorillonite with a swelling agent in the presence of a dispersion medium to form a complex, mixing the complex with the monomer, and polymerizing the monomer in the mixture. Ethanol, ethylene glycol, glycerin, a mixture of water and dimethylformamide, and acetic acid are disclosed as suitable dispersion media.

Polyolefin nanocomposites generally make use of maleic anhydride-grafted polyolefins to compatibilize and disperse an organoclay in the polymer matrix. To achieve significant intercalation usually requires a minimum graft copolymer/organoclay ratio of 5:3; exfoliation requires a 10+:3 ratio. Since the graft copolymer and the organoclay are expensive materials, the above ratios have a significant impact on the cost of the finished product.

There is therefore a need for a cost-effective alternative to maleic anhydride-grafted polyolefins for producing nanocomposites with improved mechanical performance and barrier properties.

SUMMARY OF THE INVENTION

The process of this invention for preparing a polyolefin nanocomposite comprises melt blending (1) a polyolefin and (2) a smectite clay in the presence of at least one intercalating agent that is a solid at room temperature and is selected from the group consisting of (a) hydroxy-substituted carboxylic acid esters, (2) amides, (3) hydroxy-substituted amides, and (4) oxidized polyolefins, wherein the ratio of the intercalating agent to the clay is at least 1:3, based on the ash content of the clay.

The resulting nanocomposite has increased modulus compared with nanocomposites using maleic anhydride-grafted polypropylene as a compatibilizer and dispersing agent. There is no negative effect on the strength and heat distortion temperature of the product when the intercalating agents of this invention are used.

DETAILED DESCRIPTION OF THE INVENTION

Figure 1:
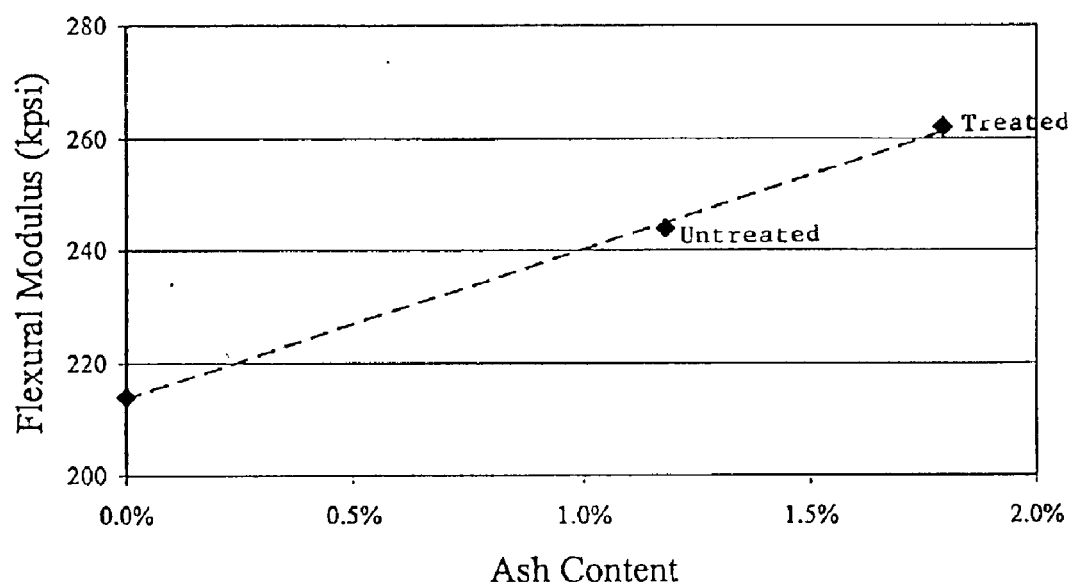
FIG. 1 is a plot of the flexural modulus (kpsi) and the ash content (%) of a nanocomposite made with an untreated montmorillonite clay and a montmorillonite clay that was treated with a quaternary ammonium compound, using the same intercalating agent.

The polyolefin used as the matrix of the composite material of this invention can be, for example, an ethylene homopolymer, a propylene homopolymer, an ethylene/propylene copolymer, a copolymer of ethylene or propylene and a $C_4$–$C_8$ alpha-olefin, e.g., linear low density polyethylene (LLDPE), low density polyethylene (LDPE), or an ethylene/propylene rubber, as long as it does not interfere with the interaction of the clay and the intercalating agent. The preferred polyolefin depends upon the desired end use of the product.

The smectite clay minerals include, for example, montmorillonite, nontronite, beidellite, volkonskoite, hectorite, saponite, sauconite, sobockite, stevensite, and svinfordite. Montmorillonite is preferred. Smectite clays have different properties than the kaolin clays conventionally used as fillers in polymer materials.

The smectite clay mineral can be untreated, or it can be modified with a swelling agent containing organic cations by treating the clay with one or more organic cation salts to exchange the metal cations present in the spaces between the layers of the clay material with organic cations, thereby substantially increasing the interlayer spacing. The expansion of the interlayer distance of the layered silicate facilitates the intercalation of the clay with other materials, in this case the olefin polymer.

The organic cation salt swelling agents have an onium ion and can have a functional ion or group that reacts with and bonds with the polymer. Examples of an onium ion include ammonium ion (—$N_3^+$), trimethylammonium ion (—$N^+$(CH$_3$)$_3$), trimethyl phosphonium ion ($P^+$(CH$_3$)$_3$), and dimethyl sulfonium ion ($S^+$(CH$_3$)$_2$). Examples of functional groups include vinyl groups, carboxyl groups, hydroxyl groups, epoxy groups, and amino groups. The organic cations can be used alone or in combination. Suitable swelling agents include, for example, poly(propylene glycol)bis(2-aminopropyl ether), poly(vinylpyrrolidone), dodecylamine hydrochloride, octadecylamine hydrochloride, and dodecylpyrrolidone. The clay can be swelled with water before introducing the quaternary ammonium ion. Such treated clays are commercially available.

The third component of the composite material is at least one intercalating agent for the smectite clay. The intercalating agent is a solid at room temperature and is selected from the group consisting of (a) hydroxy-substituted carboxylic acid esters such as, for example, glycerol monostearate, sorbitan monostearate, and sorbitan tristearate, (b) amides such as, for example, behenamide, stearyl stearamide, and ethylene bis-stearamide, (c) hydroxy-substituted amides such as, for example, stearamide ethyl alcohol, and (d) oxidized polyolefins such as, for example, oxidized polyethylene waxes and an oxidized polyethylene/oxidized ethylene vinyl acetate polymer wax. The oxidized polyolefins contain hydroxy groups and carboxylic acid ester groups as well as other oxygen-containing functional groups. Hydroxy-substituted amides are especially suitable as intercalating agents in the present invention.

The ratio of the intercalating agent to the smectite clay is at least 1:3, preferably 2:3 to 4:3, and can reach 9:3 or higher. The amount of clay is determined by measuring the ash content. The ratio of intercalating agent to smectite clay depends on the individual intercalating agent and is a function of polarity and molecular weight. The more clay that is used, the more intercalating agent is needed.

When the intercalating agents of this invention are added to a conventional system, i.e., one that does not contain a smectite clay, some physical properties of the matrix resin or the filled resin deteriorate as the amount of intercalating agent increases. Typical conventional fillers include kaolin and $CaCO_3$. In these systems, the intercalating agent acts as a processing aid or plasticizer, i.e., the melt flow rate of the matrix resin would increase and the modulus would decrease. This is not the case with nanocomposites made with the intercalating agents of this invention, i.e., there is no negative effect on strength and heat distortion temperature (HDT), and the modulus increases.

The composite materials are prepared by a process comprising melt blending (1) a polyolefin and (2) a smectite clay in the presence of at least one intercalating agent for the clay. The intercalating agent is a solid at room temperature and is selected from the group consisting of (a) hydroxy-substituted carboxylic acid esters, (b) amides, (c) hydroxy-substituted amides, and (d) oxidized polyolefins. Room temperature is 23° C. The ratio of the intercalating agent to the clay is at least 1:3, based on the ash content of the clay. Compounding is typically carried out in an extruder, but other methods of compounding can also be used. The order of blending the three components is not critical.

Typical dispersing agents for smectite clays exfoliate the silicates and uniformly disperse the individual silicate layers throughout the polymer matrix. Transmission electron micrographs of the nanocomposites of this invention show that the clay particles are not homogeneously dispersed throughout the polymer matrix. The silicate layers are not completely exfoliated, although no large agglomerates are formed.

The nanocomposites made by the process of this invention can be used to make articles of manufacture by conventional shaping processes such as melt spinning, casting, vacuum molding, sheet molding, injection molding and extruding. Examples of such articles are components for technical equipment, household equipment, sports equipment, bottles, containers, components for the electrical and electronics industries, automobile components, and fibers. They are especially useful for the fabrication of extruded films and film laminates, for example, films for use in food packaging.

The test methods used to evaluate the composites of this invention include:

| | |
|---|---|
| Tensile | ASTM D-638-89 |
| Strength @ yield | |
| Elongation @ yield | |
| Elongation @ break | |
| Flexural | ASTM D-790-86 |
| Modulus | |
| Strength | |
| Notched Izod impact | ASTM D-256-87 |
| Ash content | ASTM D-5630-01 |
| MFR (propylene polymer materials) (230° C., 2.16 kg) | ASTM D-1258 |

In this specification, all parts and percentages are by weight unless otherwise noted.

EXAMPLE 1

This example shows the effect on the physical properties of the nanocomposite product when an amide intercalating agent is used rather than a maleic anhydride-grafted polypropylene compatibilizing agent.

The compositions shown in Table 1 were compounded on a 40 mm Coperion co-rotating twin screw extruder. The extrusion conditions were: barrel temperature=190° C., RPM=400. All samples were injection molded into ASTM tensile bars on a 5 oz Battenfeld molding machine at a barrel temperature of 390° F., a mold temperature of 140° F., and an injection speed of 1 in/sec. The physical properties of each sample are given in Table 1.

In Table 1, the polypropylene (PP) was a homopolymer having a MFR of 4 dg/10 min, commercially available from Basell USA Inc. The MA-g-PP was Epolene E43 modified polypropylene wax having an acid number of 45, a number average molecular weight $M_n$ of 3900, and a weight average molecular weight $M_w$ of 9100, commercially available from Eastman Chemical Company. The organoclay was Cloisite 20A organoclay (38% organic, 62% montmorillonite), a natural montmorillonite clay that was modified with a di(tallow) di(methyl) quaternary ammonium chloride salt and is commercially available from Southern Clay Products, Inc. Fiberstab 210 stabilizer is a blend of 50% FS-042 hydroxylamine and 50% Chimassorb 119 hindered amine, commercially available from Ciba Specialty Chemicals Corporation. The intercalating agent was Adawax 280 ethylene bis-stearamide (EBS), commercially available from Rohm & Haas.

TABLE 1

| Sample No. | Control 1 | Control 2 | 1 | 2 | 3 | 4 | 5 | 6 |
|---|---|---|---|---|---|---|---|---|
| PP (%) | 100 | 91.80 | 95.80 | 94.80 | 93.80 | 92.80 | 87.80 | 87.80 |
| MA-g-PP (%) | | 5.00 | | | | | 5.00 | 7.00 |
| EBS (%) | | | 1.00 | 2.00 | 3.00 | 4.00 | 4.00 | 2.00 |
| Organo-clay (%) | | 3.00 | 3.00 | 3.00 | 3.00 | 3.00 | 3.00 | 3.00 |
| Stabilizer (%) | | 0.20 | 0.02 | 0.20 | 0.20 | 0.20 | 0.20 | 0.20 |
| MFR @ 2.16 kg (dg/10 min) | 4.0 | 4.4 | | | | 4.4 | | |
| Tensile | | | | | | | | |
| Strength @ yield (kpsi) | 5.25 | 5.26 | 5.19 | 5.24 | 5.16 | 5.23 | 4.99 | 5.15 |
| Elong. @ yield (%) | 11.3 | 9.6 | 8.6 | 7.8 | 7.3 | 7.3 | 7.2 | 7.5 |

TABLE 1-continued

| Sample No. | Control 1 | Control 2 | 1 | 2 | 3 | 4 | 5 | 6 |
|---|---|---|---|---|---|---|---|---|
| Elong. @ break (%) | 40 | 92 | 79 | 106 | 131 | 111 | 69 | 89 |
| Flexural | | | | | | | | |
| Strength (kpsi) | 6.92 | 7.09 | 7.30 | 7.37 | 7.35 | 7.44 | 7.16 | 7.34 |
| Modulus (kpsi) | 214 | 230 | 241 | 250 | 258 | 257 | 246 | 246 |
| Modulus increase (%) | — | 7 | 13 | 17 | 21 | 20 | 15 | 15 |
| Notched Izod impact (ft lb/in) | 0.5 | 0.6 | 0.7 | 0.9 | 1.2 | 1.1 | 0.8 | 0.7 |
| Ash content (%) | 0 | 1.57 | 1.84 | 1.85 | 1.83 | 1.83 | 1.80 | 1.86 |

Table 1 shows the physical properties of samples made with and without MA-g-PP and with varying amounts of EBS. The data show that notched Izod impact is improved and that the modulus enhancement is much greater with EBS relative to MA-g-PP, even at lower EBS levels. These benefits occur even though the MFR value of sample 3 is unchanged relative to the resin MFR. The modulus enhancement without an accompanying MFR change is significant because it indicates that the EBS is not functioning as a plasticizer (lowers modulus and increases melt flow rate). Instead, the data imply that the EBS is helping to achieve significant clay intercalation. This conclusion is supported by optical microscopy observations.

When EBS is combined with MA-g-PP (Samples 5 and 6 in Table 1), the physical properties indicate that there is no synergy. In fact, adding MA-g-PP compromises the properties relative to the materials formulated with just EBS. For example, Sample 5 has a lower modulus, strength, and notched Izod relative to Sample 4.

EXAMPLE 2

This example shows the effect on the physical properties of the nanocomposite product when glycerol monostearate (GMS) is used as the intercalating agent, with or without MA-g-PP.

The samples were compounded and then injection molded into ASTM tensile bars as described in Example 1. The physical properties of each sample are given in Table 2.

The PP, MA-g-PP, organoclay, and stabilizer were the same as in Example 1.

TABLE 2

| Sample No | Control 1 | Control 2 | 1 | 2 | 3 | 4 | 5 | 6 |
|---|---|---|---|---|---|---|---|---|
| PP (%) | 100 | 91.80 | 95.80 | 94.80 | 93.80 | 92.80 | 87.80 | 87.80 |
| MA-g-PP (%) | | 5.00 | | | | | 5.00 | 7.00 |
| GMS (%) | | | 1.00 | 2.00 | 3.00 | 4.00 | 4.00 | 2.00 |
| Organo-clay (%) | 3.00 | 3.00 | 3.00 | 3.00 | 3.00 | 3.00 | 3.00 | |
| Stabilizer (%) | 0.20 | 0.20 | 0.20 | 0.20 | 0.20 | 0.20 | 0.20 | |
| MFR @0 2.16 kg (dg/10 mm) | 4.0 | 4.4 | 4.0 | | | | | |
| Tensile | | | | | | | | |
| Strength @ yield (kpsi) | 5.25 | 5.26 | 5.25 | 5.26 | 5.12 | 5.00 | 4.94 | 5.16 |
| Elong. @ yield (%) | 11.3 | 9.6 | 9.1 | 8.9 | 8.9 | 8.7 | 9.6 | 9.1 |
| Elong. @ break (%) | 40 | 92 | 107 | 103 | 126 | 104 | 120 | 64 |
| Flexural | | | | | | | | |
| Modulus (kpsi) | 214 | 230 | 247 | 240 | 241 | 238 | 216 | 228 |
| Strength (kpsi) | 6.92 | 7.09 | 7.23 | 7.24 | 6.94 | 6.80 | 6.53 | 6.96 |
| Modulus increase (%) | — | 7 | 15 | 12 | 13 | 11 | 1 | 7 |
| Notched Izod (ft lb/in) | 0.5 | 0.6 | 0.7 | 0.8 | 1.0 | 1.0 | 0.7 | 0.5 |
| Ash content (%) | 0 | 1.57 | 1.83 | 1.83 | 1.85 | 1.97 | 2.08 | 2.19 |

The modulus results shown in Table 3 for samples containing GMS as the only functionalized additive (samples 1–4) are all better than the sample containing MA-g-PP as the only functionalized additive (Control 2). Notched Izod impact is also better. The data show that the combination of GMS and MA-g-PP (Samples 5 and 6) was deleterious to performance relative to GMS alone.

EXAMPLE 3

This example provides a comparison between the physical properties of nanocomposites made with equal amounts of three amide intercalating agents, and those of nanocomposites made with MA-g-PP and no intercalating agent.

The samples were compounded and molded into ASTM tensile bars as described in Example 1. The physical properties of each sample are shown in Table 3.

The PP, MA-g-PP, organoclay, and stabilizer are the same as in Example 1. Kemamide B saturated fatty amide is derived from a mixture of arachidic and behenic acids. Kemamide S-180 secondary amide is a substituted fatty amide derived from stearic acid and stearyl amine. Both are commercially available from Crompton Corporation.

TABLE 3

| Sample No. | Control 1 | Control 2 | 1 | 2 | 3 |
| --- | --- | --- | --- | --- | --- |
| PP (%) | 100 | 91.80 | 94.80 | 94.80 | 94.80 |
| MA-g-PP (%) | | 5.00 | | | |
| Kemamide B (%) | | | 2.00 | | |
| Kemamide S180 (%) | | | | 2.00 | |
| EBS (%) | | | | | 2.00 |
| Organoclay (%) | | 3.00 | 3.00 | 3.00 | 3.00 |
| Stabilizer (%) | | 0.20 | 0.20 | 0.20 | 0.20 |
| MFR @ 2.16 kg (dg/10 mm) | 4.0 | 5.2 | 4.6 | 4.8 | 4.6 |
| Tensile | | | | | |
| Strength @ yield (kpsi) | 5.25 | 5.14 | 5.01 | 4.95 | 5.06 |
| Elong. @ yield (%) | 11.3 | 9.3 | 8.8 | 8.9 | 7.8 |
| Elong. @ break (%) | 40 | 72 | 95 | 81 | 98 |
| Flexural | | | | | |
| Modulus (kpsi) | 214 | 224 | 234 | 229 | 245 |
| Strength (kpsi) | 6.92 | 6.94 | 6.91 | 6.83 | 7.12 |
| Modulus increase (%) | — | 5 | 9 | 7 | 14 |
| Notched Izod (ft lb/in) | 0.5 | 0.6 | 0.7 | 0.7 | 0.9 |
| Ash content (%) | 0 | 1.94 | 1.77 | 1.78 | 1.80 |

Sample 3 containing EBS as an intercalating agent provided the greatest enhancement in modulus, but all amide intercalating agents provide better enhancement than Control 2.

EXAMPLE 4

This example shows the effects of several other types of intercalating agents on the physical properties of the samples.

The samples were compounded and injection molded into ASTM tensile bars as described in Example 1. The physical properties of the samples are given in Tables 4 and 5.

The PP, MA-g-PP, organoclay, and the stabilizer are the same as in Example 1. STS is Glycomul TS K sorbitan tristearate, commercially available from Lonza Inc. Lonzest SMS sorbitan monostearate is commercially available from Lonza Inc. Abriflo 65 stearamide ethyl alcohol is commercially available from Abril Industrial Waxes Ltd. Paracin 220 hydroxyamide and Paricin 285 hydroxyamide are aliphatic hydroxyamides commercially available from CasChem Inc.

TABLE 4

| Sample No. | Control 1 | Control 2 | 1 | 2 | 3 |
| --- | --- | --- | --- | --- | --- |
| PP (%) | 100 | 91.8 | 94.80 | 94.80 | 94.80 |
| MA-g-PP (%) | | 5.00 | | | |
| GMS (%) | | | 2.00 | | |
| STS (%) | | | | 2.00 | |
| SMS (%) | | | | | 2.00 |
| Organo-clay (%) | | 3.00 | 3.00 | 3.00 | 3.00 |
| Stabilizer (%) | | 0.20 | 0.20 | 0.20 | 0.20 |
| MFR @ 2.16 kg (dg/10 mm) | 4.0 | 5.2 | 5.0 | 5.3 | 5.1 |
| Tensile | | | | | |
| Strength @ yield (kpsi) | 5.25 | 5.14 | 4.98 | 5.03 | 5.03 |
| Elong. @ yield (%) | 11.3 | 9.3 | 9.1 | 9.1 | 7.8 |
| Elong. @ break (%) | 40 | 72 | 135 | 104 | 130 |
| Flexural | | | | | |
| Modulus (kpsi) | 214 | 224 | 238 | 234 | 253 |
| Strength (kpsi) | 6.92 | 6.94 | 6.89 | 6.96 | 7.23 |
| Modulus increase (%) | — | 5 | 11 | 9 | 18 |
| Notched Izod (ft lb/in) | 0.5 | 0.6 | 0.7 | 0.7 | 0.7 |
| Ash content (%) | 0 | 1.94 | 1.76 | 1.81 | 1.80 |

TABLE 5

| Sample No. | Control 1 | Control 2 | 1 | 2 | 3 |
| --- | --- | --- | --- | --- | --- |
| PP (%) | 100 | 91.80 | 94.80 | 94.80 | 94.80 |
| MA-g-PP (%) | | 5.00 | | | |
| Paricin 285 (%) | | | 2.00 | | |
| Paricin 220 (%) | | | | 2.00 | |
| Abriflo 65 | | | | | 2.00 |
| Organoclay (%) | | 3.00 | 3.00 | 3.00 | 3.00 |
| Stabilizer (%) | | 0.20 | 0.20 | 0.20 | 0.20 |
| MFR at 2.16 kg | | 5.2 | | | 5.3 |
| Tensile | | | | | |
| Strength @ yield (kpsi) | 5.25 | 5.14 | 5.29 | 5.20 | 5.04 |
| Elong. @ yield (%) | 11.3 | 9.3 | 7.7 | 7.7 | 8.7 |
| Elong. @ break (%) | 40 | 72 | 100 | 120 | 89 |
| Flexural | | | | | |
| Modulus (kpsi) | 214 | 224 | 263 | 270 | 243 |
| Strength (kpsi) | 6.92 | 6.94 | 7.61 | 7.61 | 6.97 |
| Modulus increase (%) | — | 5 | 23 | 26 | 14 |
| Notched Izod (ft lb/in) | 0.5 | 0.6 | 0.9 | 1.0 | 0.7 |
| Ash content (%) | 0 | 1.94 | 1.96 | 1.86 | 1.90 |

The data show that both Paricin products provide the same modulus enhancement as EBS. All of the samples formulated with intercalating agents have better modulus enhancement than Control 2.

EXAMPLE 5

This example shows the effects of oxidized polyethylene-type intercalating agents on the physical properties of the samples.

The samples were compounded and injection molded into ASTM tensile bars as described in Example 1. The physical properties of the samples are given in Table 6.

The PP, MA-g-PP, organoclay, and stabilizer were the same as in Example 1. AC 656 oxidized PE wax has a drop point of 98° C., a viscosity (cps) of 185 at 140° C., and an acid number of 15. AC 395 oxidized HDPE wax has a drop point of 137° C., a viscosity of 2500 at 150° C. and an acid number of 41. AC 316 oxidized HDPE wax has a drop point of 140° C., a viscosity of 8500 at 150° C., and an acid number of 16. AC 645 is an oxidized PE/oxidized EVA copolymer wax (<30%/>70%). All are commercially available from Honeywell.

TABLE 6

| Sample No. | Control 1 | Control 2 | 1 | 2 | 3 | 4 |
|---|---|---|---|---|---|---|
| PP (%) | 100 | 91.8 | 94.80 | 94.80 | 94.80 | 94.80 |
| MA-g-PP (%) | | 5.00 | | | | |
| AC 656 (%) | | | 2.00 | | | |
| AC 645 (%) | | | | 2.00 | | |
| AC 395 (%) | | | | 2.00 | | |
| AC 316 (%) | | | | | | 2.00 |
| Organoclay (%) | | 3.00 | 3.00 | 3.00 | 3.00 | 3.00 |
| Stabilizer (%) | | 0.2 | 0.20 | 0.20 | 0.20 | 0.20 |
| Tensile | | | | | | |
| Strength @ yield (kpsi) | 5.25 | 5.14 | 4.97 | 5.06 | 5.12 | 5.17 |
| Elong. @ break (%) | 40 | 72 | 100 | 120 | 110 | 120 |
| Elong. @ yield (%) | 11.3 | 9.3 | 9.8 | 9.5 | 9.0 | 9.0 |
| Flexural | | | | | | |
| Modulus (kpsi) | 214 | 224 | 224 | 239 | 247 | 250 |
| Strength (kpsi) | 6.92 | 6.94 | 6.78 | 7.12 | 7.33 | 7.35 |
| Modulus increase (%) | — | 5 | 5 | 12 | 15 | 17 |
| Notched Izod (ft lb/in) | 0.5 | 0.6 | 0.6 | 0.7 | 0.7 | 0.7 |
| Ash content (%) | 0 | 1.94 | 1.74 | 1.78 | 1.76 | 1.78 |

EXAMPLE 6

This example provides a comparison between the physical properties of a nanocomposite made with a clay that has been treated with a quaternary ammonium compound, and an unmodified clay, using the same intercalating agent.

The samples were compounded and molded into ASTM tensile bars as described in Example 1. The physical properties of the samples are given in Table 7. The PP, stabilizer, organoclay, and EBS are the same as in Example 1. Nanocor PGW unmodified purified montmorillonite clay is commercially available from Nanocor Inc.

TABLE 7

| Sample No. | Control | 1 | 2 |
|---|---|---|---|
| PP (%) | 100 | 94.80 | 94.80 |
| EBS (%) | | 2.00 | 3.00 |
| Organoclay (%) | | 3.00 | |
| Nanocor PGW (%) | | | 2.00 |
| Stabilizer (%) | | 0.20 | 0.20 |
| Tensile | | | |
| Strength @ yield (kpsi) | 5.25 | 5.14 | 5.03 |
| Elong. @ yield (%) | 11.3 | 7.7 | 9.0 |
| Elong. @ break (%) | 40 | 123 | 85 |
| Flexural | | | |
| Strength (kpsi) | 6.92 | 7.46 | 7.13 |
| Modulus (kpsi) | 214 | 262 | 244 |
| Notched Izod (ft lb/in) | 0.5 | 1.1 | 1.1 |
| Ash content (%) | 0 | 1.79 | 1.18 |

The properties of the treated and untreated clays are compared graphically in FIG. 1. The moduli of the resin, the untreated clay, and the organoclay are linearly related. The modulus enhancement of the untreated clay with EBS is the same as the modulus enhancement of the organoclay with EBS on an ash content compensated based, despite the poorer dispersion of the untreated clay as determined by optical microscopy.

EXAMPLE 7

This example shows the effect on the physical properties of a linear low density polyethylene (LLDPE) nanocomposite when SMS is used as an intercalating agent.

The compositions shown in Table 8 were compounded on a 40 mm Coperion co-rotating twin screw extruder at a barrel temperature of 200° C. and 600 RPM. The samples were injection molded into ASTM tensile bars on a 5 oz Battenfeld molding machine at a barrel temperature of 350° F., a mold temperature of 90° F., and an injection speed of 0.5 in/sec. The physical properties of each sample are given in Table 8.

The organoclay and the stabilizer were the same as in Example 1. The LLDPE contained propylene and butene-1 as the comonomers and is commercially available from Daelim Industrial Co., Ltd. SMS is described in Example 4. AC 575 ethylene/maleic anhydride copolymer is commercially available from Honeywell.

TABLE 8

| Sample No. | Control 1 | Control 2 | Control 3 | 1 |
|---|---|---|---|---|
| LLDPE (%) | 100 | 95.80 | 91.8 | 91.80 |
| AC 575 | | | 4.00 | |
| SMS (%) | | | | 4.00 |
| Organoclay (%) | | 4.00 | 4.00 | 4.00 |
| Stabilizer (%) | | 0.20% | 0.20 | 0.20 |
| Tensile | | | | |
| Max. strength (kpsi) | 2.26 | 1.97 | 2.20 | 2.10 |
| Elong. @ break (%) | 500+ | 450 | 500+ | 500+ |
| Flexural | | | | |
| Modulus (kpsi) | 40.9 | 46.8 | 46.7 | 47.0 |
| Strength (kpsi) | 1.55 | 1.70 | 1.75 | 1.69 |
| Modulus increase (%) | — | 14 | 14 | 15 |
| Ash content (%) | — | 2.22 | 2.39 | 2.42 |

The data show that the nanocomposite product has increased modulus with no negative effect on the strength of the product when sorbitan monostearate is used as the intercalating agent. As shown by an optical micrograph by transmitted light, the optical dispersion of the clay particles in Sample 1 was better than that of Controls 2 and 3, even though the physical properties were similar. This property must be taken into account in applications where appearance is important, e.g., making films.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A process for preparing a polyolefin nanocomposite comprising melt blending (a) a polyolefin and (b) a smectite clay, in the presence of at least one intercalating agent that is a solid at room temperature and is selected from the group consisting of (i) hydroxy-substituted amides, and (ii) oxidized polyolefins, wherein the ratio of the intercalating agent to the clay is at least 1:3, based on the ash content of the clay.

2. The process of claim 1, wherein the polyolefin (a) is a propylene homopolymer.

3. The process of claim 1, wherein the polyolefin (a) is an ethylene homopolymer.

4. The process of claim 1, wherein the polyolefin (a) is a copolymer of ethylene and a $C_4$–$C_8$ α-olefin.

5. The process of claim 1, wherein the smectite clay is montmorillonite.

6. The process of claim 1, wherein the intercalating agent is a hydroxy substituted amide.

7. The process of claim 6, wherein the intercalating agent is stearamide ethyl alcohol.

8. The process of claim 1, wherein the intercalating agent is an oxidized polyolefin.

9. The process of claim 8 wherein the oxidized polyolefin is oxidized polyethylene wax.

10. The process of claim 8 wherein the oxidized polyolefin is an oxidized polyethylene/polyvinyl acetate polymer wax.

11. A process for preparing a polyolefin nanocomposite comprising melt blending (a) a polyolefin, (b) a smectite clay, and (c) at least one intercalating agent that is a solid at room temperature and is selected from the group consisting of (i) hydroxy-substituted carboxylic acid esters, and (ii) amides, wherein the ratio of the intercalating agent to the clay is at least 1:3, based on the ash content of the clay.

12. The process of claim 11, wherein the polyolefin (a) is a propylene homopolymer.

13. The process of claim 11, wherein the polyolefin (a) is an ethylene homopolymer.

14. The process of claim 11, wherein the polyolefin (a) is a copolymer of ethylene and a $C_4$–$C_8$ α-olefin.

15. The process of claim 11 wherein the smectite clay is montmorillonite.

16. The process of claim 11 wherein the intercalating agent is a hydroxy-substituted carboxylic acid ester.

17. The process of claim 16 wherein the hydroxy-substituted carboxylic acid ester is sorbitan monostearate.

18. The process of claim 16 wherein the hydroxy-substituted carboxylic acid ester is glycerol monostearate.

19. The process of claim 16 wherein the hydroxy-substituted carboxylic acid ester is sorbitan tristearate.

20. The process of claim 11 wherein the intercalating agent is an amide.

21. The process of claim 20 wherein the intercalating agent is ethylene bis-stearamide.

22. A process for preparing a polyolefin nanocomposite consisting essentially of melt blending (a) a polyolefin and (b) a smectite clay, in the presence of at least one intercalating agent that is a solid at room temperature and is selected from the group consisting of (i) hydroxy-substituted carboxylic acid esters, and (ii) amides, wherein the ratio of the intercalating agent to the clay is at least 1:3, based on the ash content of the clay.

23. The process of claim 22 wherein the polyolefin (a) is a propylene homopolymer.

24. The process of claim 22 wherein the polyolefin (a) is an ethylene homopolymer.

25. The process of claim 22 wherein the polyolefin (a) is a copolymer of ethylene and a $C_4$–$C_8$ α-olefin.

26. The process of claim 22 wherein the smectite clay is montmorillonite.

27. The process of claim 22 wherein the intercalating agent is a hydroxy-substituted carboxylic acid ester.

28. The process of claim 27 wherein the hydroxy-substituted carboxylic acid ester is sorbitan monostearate.

29. The process of claim 27 wherein the hydroxy-substituted carboxylic acid ester is glycerol monostearate.

30. The process of claim 27 wherein the hydroxy-substituted carboxylic acid ester is sorbitan tristearate.

31. The process of claim 22 wherein the intercalating agent is an amide.

32. The process of claim 31 wherein the intercalating agent is ethylene bis-stearamide.

* * * * *